April 24, 1945.   N. B. HAUSMAN   2,374,542
CLUTCH
Filed April 14, 1944
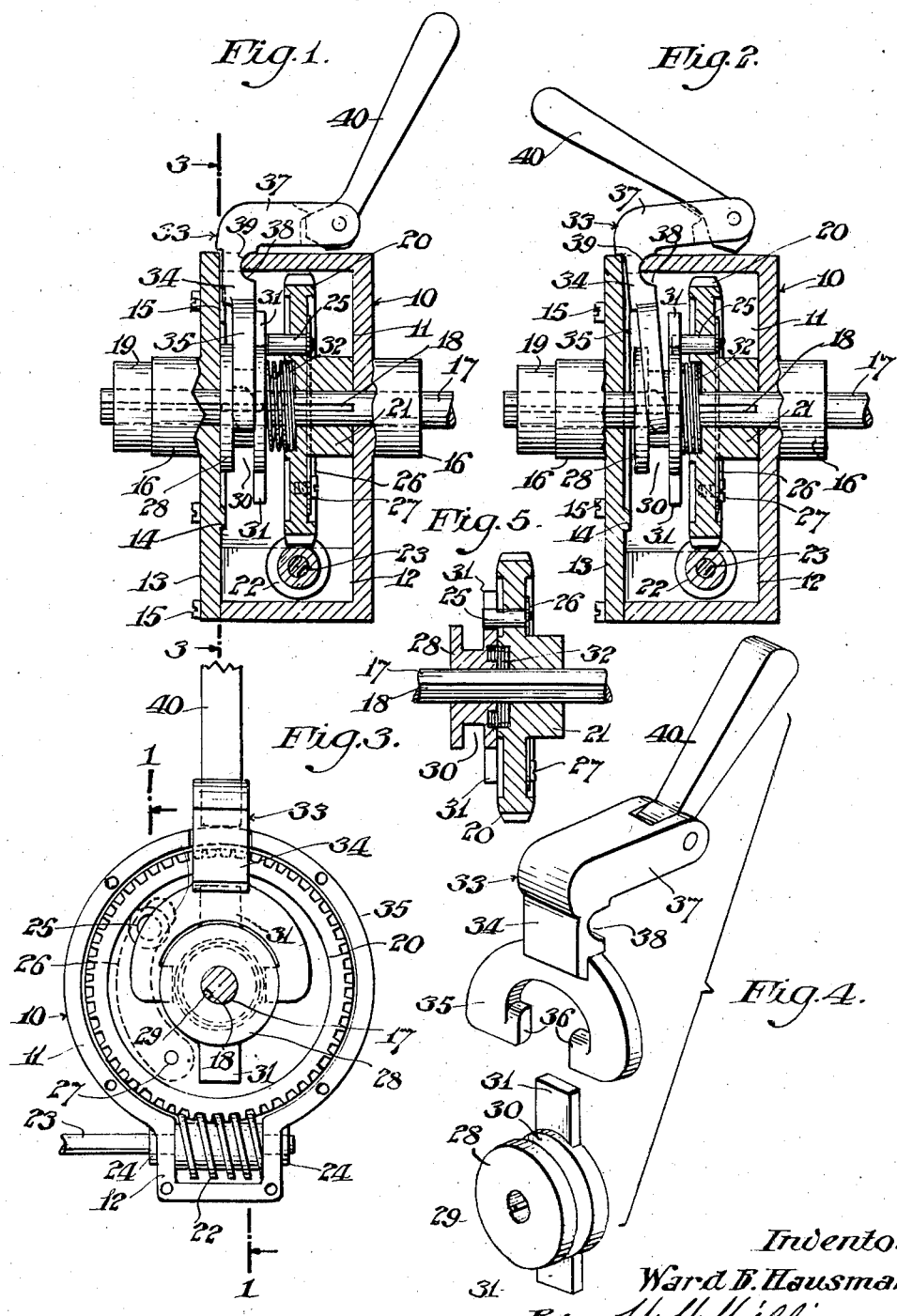

Patented Apr. 24, 1945

2,374,542

UNITED STATES PATENT OFFICE 2,374,542

CLUTCH

Ward B. Hausman, Philadelphia, Pa.

Application April 14, 1944, Serial No. 531,080

3 Claims. (Cl. 192—67)

My invention relates to a new and useful clutch and more particularly the combination of a clutch and speed reducer contained in one gear box.

One of the objects of my invention is to provide a simple and effective means for selectively and positively transmitting motion from a driving mechanism to a driven mechanism.

Another object of this invention is to construct a combination clutch and speed reducer including a gear free on a driven shaft and carrying a spring pressed pin to be engaged by a slidable clutch element keyed to the above mentioned driven shaft and means to shift the slidable clutch element.

Another object of the invention is to provide a clutch comprising a driven clutch member revolvably mounted on a driven shaft, a slidable clutch element movable longitudinally of said driven shaft, and a shifting means consisting of a rocking lever and a cam lever.

A further object of the invention is to provide a unique shifting means comprising a rocking lever swingingly mounted on an edge of the gear box and having a cam lever pivoted to the rocking lever and coacting with said gear box to swing said rocking lever in one direction.

A still further object of the invention is to provide a device of the character mentioned consisting of a gear box into which projects a driving shaft having a worm fixed thereon and meshing with a worm gear revolvably mounted on a driven shaft extending through the gear box, said worm gear carrying a spring pressed pin to engage a slidable clutch element keyed to said driven shaft and movable by a shifting means consisting of a rocking lever swingingly mounted on an edge of the housing and provided with a right angle arm overlying a wall of said gear box to which rocking lever is pivoted a cam lever cooperating with the gear box to swing the rocking lever in one direction, the latter being urged in the opposite direction by a spring between the slidable clutch element and the worm gear.

With the above and other objects in view, this invention consists of the details of construction and combination of elements hereinafter set forth and then designated by the claims.

In order that those skilled in the art to which this invention appertains may understand how to make and use the same, I will describe its construction in detail, referring my numerals to the accompanying drawing forming a part hereof, in which:

Fig. 1 is a sectional elevation of the clutch on the line 1—1 of Fig. 3 and showing it in a released position.

Fig. 2 is a similar view of the clutch shown in an engaged position.

Fig. 3 is a view on the line 3—3 of Fig. 1.

Fig. 4 is an exploded view in perspective of the slidable clutch element and its shifting means.

Fig. 5 is a fragmentary sectional view of the two clutch elements engaged and illustrating certain details of construction.

In carrying out my invention as herein embodied 10 represents a gear box or housing including a body 11 open at one end and preferably of circular formation with a reduced offset portion 12. The open end of the body 11 is normally closed by a cap or cover 13 having a rib 14 projecting from its inner surface to assist in centering said cover which is held in place by fastening devices 15, such as screws. Both the body 11 and the cover 13 may have a boss 16 to provide extended bearings for the driven shaft 17 which passes through the gear box and has a keyway 18 formed therein. The driven shaft 17 may be held against longitudinal movement in one direction by a collar 19 fixed thereon.

On the driven shaft 17 within the body of the gear box is revolvably mounted a worm gear 20 that has a hub 21 to bear against the inner surface of the end wall of said gear box body. This worm gear 20 meshes with a worm 22 located in the reduced offset portion 12 of the gear box and fixed to the driving shaft 23 which projects through said reduced portion and may be journalled in bearings 24 mounted in the opposite side walls of said reduced portion. The driving shaft 23 receives its motion from any suitable source of power.

A pin 25 is slidably mounted on the gear and projects entirely through said gear so that an end of said pin extends beyond the inner face of the gear and said pin is constantly urged forwardly by a spring 26. Preferably this spring is a flat arcuate one having an end anchored at 27 to the outer face of the gear with the pin 25 fixed to the free end of said spring.

Splined on the driven shaft 17 adjacent the gear 20 is a movable clutch element 28 having a key 29 for registration with the keyway 18 in the shaft 17 so that said driven shaft and movable clutch element revolve together and the latter is slidable longitudinally of the shaft. This movable clutch element has a peripheral groove 30 and includes radial arms 31. The movable clutch element 28 and the gear 20 are urged apart by a spring 32 having its ends seated in annular grooves or recesses in the adjacent or opposed faces of said movable clutch element and gear as plainly shown in Fig. 5.

The shifting means for the movable clutch element includes a rocking lever 33 fashioned to provide a depending arm 34 formed with a yoke 35 having inturned fingers 36 to project into the peripheral groove 30, and a right angle substantially horizontal arm 37 which, when the parts are assembled, overlies an outside surface of the gear box. The rocking lever is provided with a concave bearing surface 38 that engages a curved fulcrum 39 on the inner wall of a notch in a wall of the gear box in which a portion of the depending arm of the rocking lever is positioned.

To the free end of the arm 37 is pivoted a cam lever 40, the cam portion of which coacts with a surface of the gear box to swing the yoke and shift the movable clutch element towards the gear 20.

As illustrated in Fig. 1, the cam lever 40 is positioned to disengage its inner end or the high part of the cam from the gear box surface and the action of the spring 32 will retract the movable clutch element and the driven mechanism will stop or remain stationary. By moving the cam lever 40 to the opposite position, as shown in Fig. 2, the inner end of said cam lever will engage the gear box surface and raise the outer end of the arm 37 of the rocking lever 33 and cause the yoke 35 to slide the movable clutch element 28 towards the gear 20, bring one of the arms 31 into the path of travel of the pin 25 on said gear 20. This will cause the movable clutch member 28 to revolve with the gear 20 and transmit motion to the driven shaft 17.

If at the time the movable clutch element is actuated for connecting the driving and driven mechanisms, an arm 31 should be in alignment with the pin 25 so as to engage the end of the latter; said pin will be forced out of the way against the action of its spring 26 until such contacting arm 31 can pass over the pin. At this time the pin will be returned to its normal position in the path of travel of the following arm 31.

From the foregoing it will be apparent that I have provided an exceedingly simple and effective device of this character capable of application to various classes of machinery for connecting the driving and driven mechanisms through speed reduction gearing.

Of course I do not wish to be limited to the exact details of construction herein shown and described, as these may be varied within the scope of the appended claims without departing from the spirit of the invention.

Having described my invention, what I claim as new and useful is:

1. A clutch comprising a gear adapted to be revolvably mounted on a driven shaft, a pin slidably mounted on said gear, means to normally urge said pin longitudinally forwardly so that an end thereof projects beyond a face of the gear, a movable clutch element adapted to be splined to the driven shaft and provided with radial arms to engage the pin sidewise for connecting the movable clutch element and gear, said pin being pushed back when engaged endwise, means to urge the movable clutch element away from the gear, and means to shift said movable clutch element towards said gear.

2. The clutch set forth in claim 1 wherein the means to urge the pin forwardly is an arcuate flat spring having one end anchored to the gear and the other end fixed to the pin.

3. The combination of a gear box including a body open at one end, a curved fulcrum formed on an edge of the open end of said body, a cover to close said open end, a driven shaft passing through said gear box, a gear revolvably mounted on said shaft, a spring pressed pin carried by said gear, a movable clutch element splined on said driven shaft for engagement with the pin, means to urge said movable clutch element away from the gear, and a shifting means to slide the movable clutch element towards the gear, said shifting means comprising a rocking lever including a depending arm having a concave bearing surface to swing on the fulcrum, a yoke at the inner end of the depending arm and coacting with movable clutch element, another arm projecting at right angles from the outer end of the depending arm and overlying a wall of the gear box and a cam lever pivoted to the free end of said other arm and coacting with the outer surface of the gear box to swing the rocking lever in one direction.

WARD B. HAUSMAN.